United States Patent

Mack et al.

[11] 3,878,364
[45] Apr. 15, 1975

[54] MEDIA TRAY FOR USE IN A CREDIT AUTHORIZATION TERMINAL OF A DATA PROCESSING SYSTEM

[75] Inventors: Ronald H. Mack, Plymouth; Donald L. Bumgardner, South Lyon, both of Mich.

[73] Assignee: Burroughs Corporation, Detroit, Mich.

[22] Filed: Mar. 29, 1974

[21] Appl. No.: 456,300

[52] U.S. Cl. ................ 235/61.7 B; 235/61.11 R
[51] Int. Cl. ................ G06k 15/00; G06k 7/08
[58] Field of Search ............ 340/149 A; 235/61.7 B, 235/61.9 A, 61.9 R, 61.6 R, 61.11 R; 101/292, 407 BP, 408, DIG. 18

[56] References Cited
UNITED STATES PATENTS

| | | | |
|---|---|---|---|
| 3,602,139 | 8/1971 | Allport | 235/61.7 B |
| 3,617,706 | 11/1971 | Oberhart | 235/61.7 B |
| 3,818,187 | 6/1974 | Lovendusky | 235/61.7 B |

*Primary Examiner*—Daryl W. Cook
*Attorney, Agent, or Firm*—Edwin W. Uren; Edward G. Fiorito; Paul W. Fish

[57] ABSTRACT

A credit authorization or point of sale terminal unit of a data processing system is provided with a media tray that is translatable as between a media receiving position and a media processing position within supporting and guideway structure of the terminal, the tray serving to receive and to retainably position a magnetic stripe credit card and a multi-sheet transaction document for input reading therefrom and output printing thereon, respectively. The media tray, in addition to being provided with means for receiving and positioning the magnetic stripe credit card and the multi-sheet transaction document, is also provided with means for preventing its translation from its media receiving position to its media processing position when either a magnetic stripe credit card or a multi-sheet transaction document is not properly positioned within the tray, and with means for removing the curl associated with the individual sheets of the multi-sheet document as the tray is translated from its media receiving position to its media processing position.

25 Claims, 15 Drawing Figures

MEDIA TRAY FOR USE IN A CREDIT AUTHORIZATION TERMINAL OF A DATA PROCESSING SYSTEM

BACKGROUND OF THE INVENTION

In an endeavor to adapt the rapidly developing computer and data processing technology to the specialized needs of large merchandising establishments, such that the benefits thereof might be extended to the several points within the establishment where merchandise may be purchased on a credit basis, various terminal units of a point of sale or credit authorization nature have made their appearance in the market place. These terminals have been disseminated throughout the various sales departments and interfaced with centralized computers to form data processing networks. To effectively serve the best interests of the merchandiser, any extension of automatic data processing to the individual sales departments should provide continuous surveillance and control over customer credit accounts, interrogation as to the status of an account at the time of a contemplated credit sale, authorization or denial of a credit extension according to such account status, and immediate updating of the account should credit extension be granted.

Certain of the point of sale or credit authorization terminal units that have thus far made their appearance have been characterized by a translatable media tray for receiving customer credit cards and transaction documents covering contemplated credit sales. The transaction documents have generally been of a multi-sheet nature, in order that the customer might be provided with a copy should the contemplated transaction be approved. To briefly describe the function and operation of a typical credit authorization terminal unit, reference is made to FIG. 1 wherein one of several such units comprising a network is designated at 11. Upon the initiation of a credit purchase by a customer in a given sales department, the sales representative would write the details of the transaction in the lower right hand area of a multi-sheet transaction document 13 (FIG. 3), take the transaction document 13 and the customers credit card 15 (FIGS. 2A and 2B) to the terminal unit 11 for credit authorization, and for the output printing of the transaction data on the multi-sheet document should the contemplated transaction be approved. The credit card 15 would first be placed in the open media tray 17, in the area designated 19 in FIG. 1 and defined in part by a pair of resilient retention fingers 21. The credit card 15 would be placed in the media tray with its identification data (as illustrated in FIG. 2A) facing upward, and with the magnetic stripe 23 latitudinally positioned on the reverse side thereof facing downward. The multi-sheet transaction document 13 would then be positioned within the media tray in overlapping relationship with the credit card 15, and with its left and lowermost edges disposed in abutting relationship relative to appropriate positioning members. With the customers credit card 15 and the multi-sheet transaction document 13 properly positioned in the tray, the sales representative would then enter the transaction data in the keyboard 25 (for temporary storage in a buffer), translate the media tray 17 to its closed media processing position, and depress an appropriate operation key for transmitting the data to the computer. Upon depression of the operation key, a magnetic read head (not shown), which is synchronized with a print roller carrier 27 (FIG. 4) for reverse movement relative thereto, is translated from left to right to thereby read the customer identification data from the magnetic stripe 23 on the reverse side of the credit card 15. This customer identification data, along with the transaction data stored in the buffer, is then transmitted to the computer for account interrogation and credit authorization. In the event the credit transaction is approved, in accordance with the status of the account and credit information stored in the computer, a transaction code would be transmitted to the terminal unit 11 and entered in transaction code print wheels 29 shown in FIGS. 5 and 11. Coincidentally with the entry of the transaction code in the print wheels 29, the transaction data temporarily stored in the buffer is transferred to the transaction data print wheels 31, and the print roller carrier 27 is translated from left to right to its home position to impressably print the transaction data, date, and transaction code on designated areas of the multi-sheet document 13, as illustrated in FIG. 3. It is to be noted that the date print wheels 33 (FIGS. 1 and 5) are carried by the media tray 17 in order to facilitate updating at the outset of each sales day. The synchronized reverse translation of the print roller carrier 27 and the magnetic read head in typical terminal units may be accomplished by means of a reversible motor 35 and an endless draw cord 37 that is windable around a grooved capstan 39, as best illustrated in FIG. 4. Provision may also be made in the media tray 17 for receiving an embossed merchants identification plate, as indicated at 41 in FIG. 1, in which case the printable translation of the print roller carrier 27 would also impressably print corresponding merchant identification data on the face of the multi-sheet transaction document 13, in the area designated 43 in FIG. 3. Means designated at 45 in FIGS. 5 and 11 may be employed to lock the media tray 17 in its closed media processing position until such time as an authorized credit transaction has been printably recorded on the document, or until credit authorization is denied, at which time a latch (not shown) would be released by solenoid pulsing to initiate a spring driven translation of the tray to its open media receiving and releasing position. A pair of activatable dowel pins may also be employed to provide stability to the media tray 17 during the impressable printing of data on the face of the transaction document 13, as for example to provide stabilizing entry into a pair of dowel pin apertures 47 (FIG. 7) formed in the left and right extremities of the media tray 17. These and other features and characteristics of known credit authorization terminal units, which neither form a part of the present invention nor find detailed explanation herein, may be provided a given terminal unit according to the performance results that may be desired.

Known credit authorization terminal units of the type briefly described in the foregoing have been characterized by various operational problems resulting either from acts of omission on the part of the sales representative or from limitations in the hardware structure of the unit itself. For example, failure of the sales representative to properly position both a credit card and a multi-sheet transaction document in the media tray, before closing the tray and depressing the operation key, results in a misoperation of the data processing system, with its attendant waste of time on the part of the customer, the sales representative and the system itself.

Failure of the hardware structure of the unit to effectively deal with the characteristic curl associated with the individual sheets of multi-sheet documents results in low quality of illegible printing of output data on the fact of the transaction documents. In either of these problems situations, the anticipated objectives of automatic data processing are not realized, nor expected time savings goals achieved.

SUMMARY OF THE INVENTION

It is accordingly an object of the present invention to provide an improved media tray for use in a point of sale or credit authorization terminal unit, such tray being designed and implemented to overcome the above described operational problems involving both human omissions and hardware limitations.

It is a particular object of the present invention to provide an improved media tray that effectively deals with the customary curl of the individual sheets of multi-sheet transaction documents, and that assures a high quality of printed output data on the face of multi-sheet transaction documents.

It is a further particular object of the present invention to provide a media tray that incorporates means preventing its translation to a closed media processing position until both a credit card and a multi-sheet transaction document have been properly positioned therewithin.

It is yet another particular object of the present invention to provide a media tray for use in a point of sale or credit authorization terminal unit that incorporates means not only for initially removing the curl of the sheets of multi-sheet documents, but that securably holds the documents in an uncurled state throughout the interval of their processing.

An important aspect of the present invention is the inclusion in a media tray of a pivotally mounted limit member that is blockably associated with the supporting structure of the terminal unit, and linkage means cooperably associated with the limit member and the underside of a magnetic stripe credit card and a multi-sheet transaction document positioned within the tray, such linkage means being effective for elevating the limit member to an unblocking relationship with the supporting structure when a credit card and a transaction document are both positioned within the tray, the elevated position of the limit member permitting translation of the tray to its closed media processing position. The absence of either a credit card or a transaction document within the tray, on the other hand, will serve to dispose the limit member in a blocking relationship with the supporting structure such that the tray may not be translated to its closed media processing position.

Another important aspect of the invention is the provision in a media tray of a pivotally and translatably activatable elongated document engaging member or bail, and separate linkage means responsive to the supporting and guideway structure of the terminal unit for pivotally activating the bail as between a document engaging position and a document receiving and releasing position, and for translatably activating the bail as between a curl engaging position and a curl removed position, said activations of the bail to its document engaging and curl removed positions occurring as said tray is translated from its open media receiving position to its closed media processing position, and said activations of the bail to its document releasing and curl engaging positions occurring as said tray is translated from its closed media processing position to its open media receiving position.

BRIEF DESCRIPTION OF THE DRAWING

These and other objects, aspects and advantages of the invention will become apparent from the following description when read in conjunction with the accompanying drawing figures in which.

DESCRIPTION OF THE PREFERRED EMBODIMENT

Figure 1:
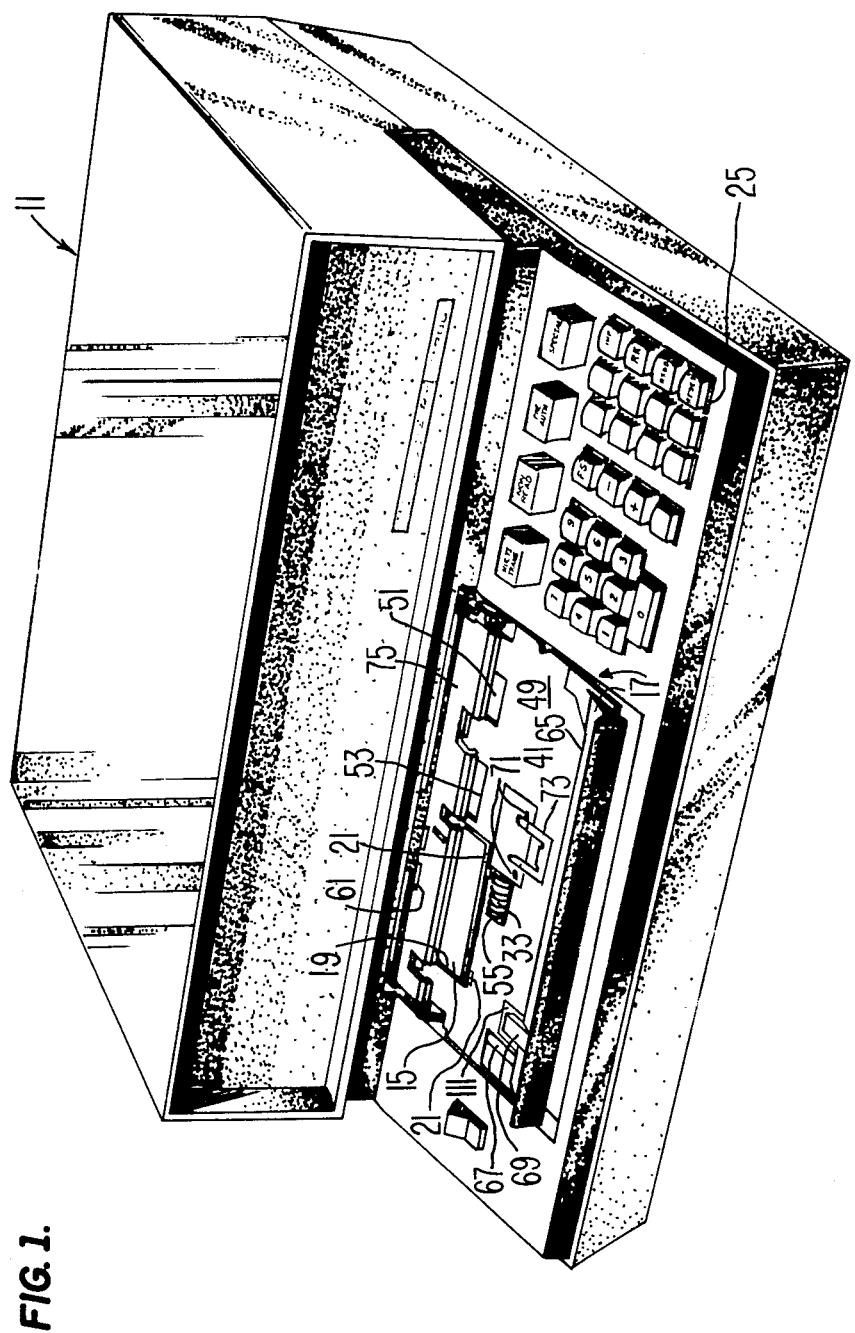
FIG. 1 is a perspective view of a typical credit authorization terminal unit in which the inventive media tray is shown in its open media receiving position.
Figure 2A:
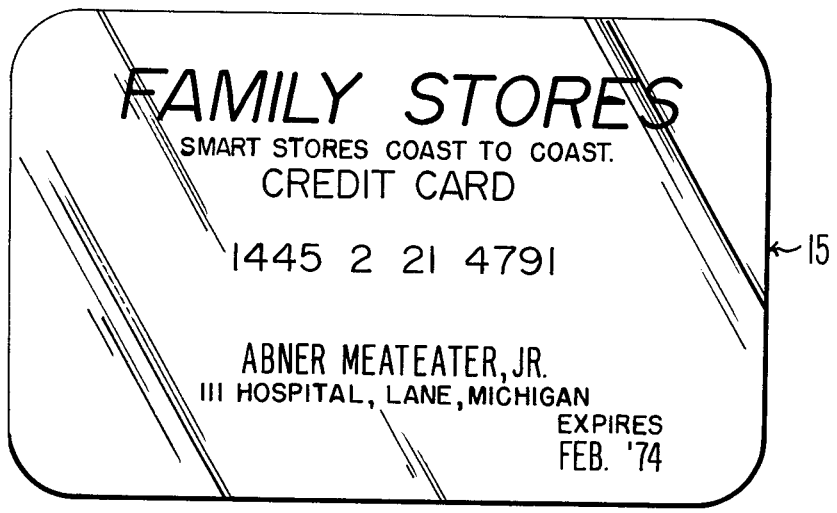
FIG. 2A is a front view of a credit card of the type that may be utilized in the terminal unit shown in FIG. 1.
Figure 2B:
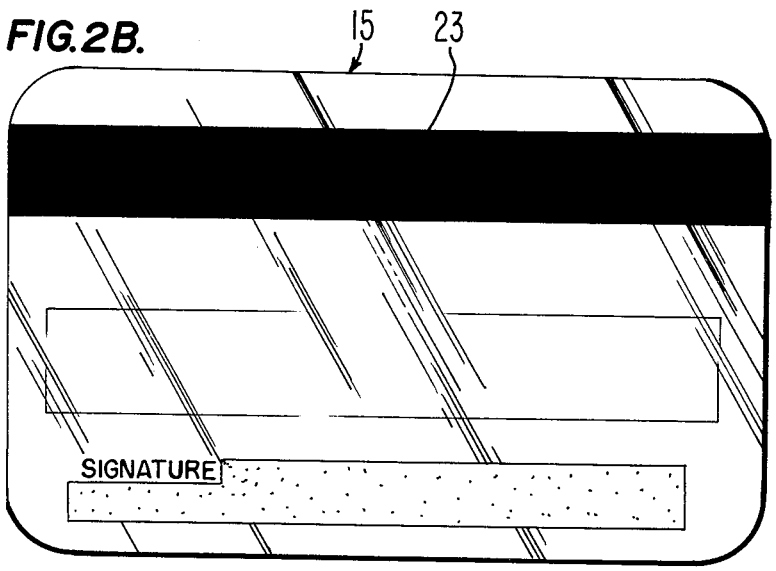
FIG. 2B is a view of the reverse side of the credit card illustrated in FIG. 2A and showing a magnetic stripe latitudinally disposed along the upper portion thereof.
Figure 3:
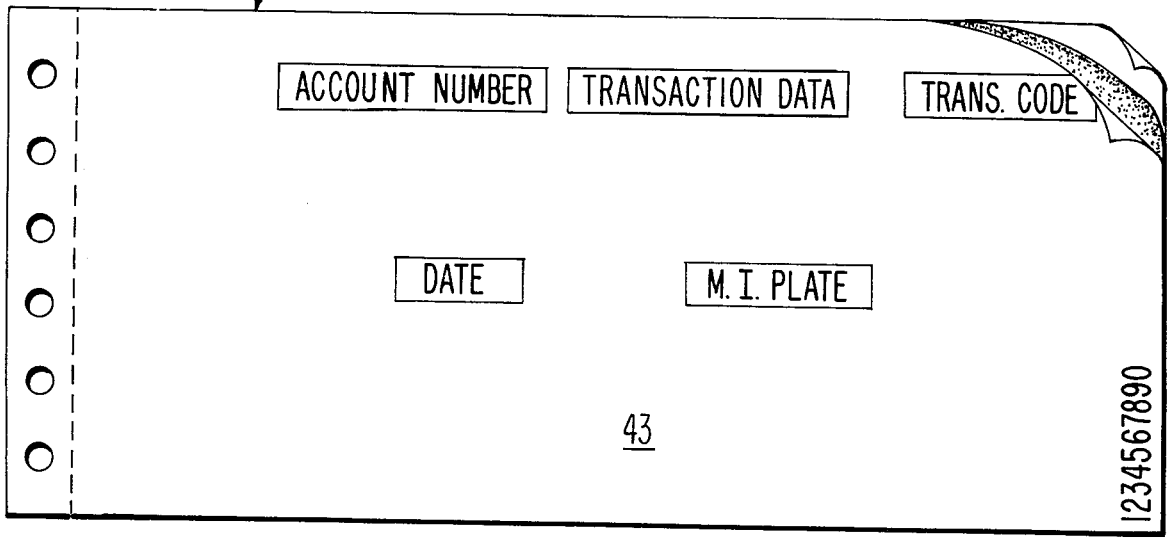
FIG. 3 is a plan view of a multi-sheet transaction document of the type that may be utilized in the terminal unit illustrated in FIG. 1, the upper right corner of the individual sheets of the document being curled to illustrate the type of curl that generally characterizes such multi-sheet documents.
Figure 4:
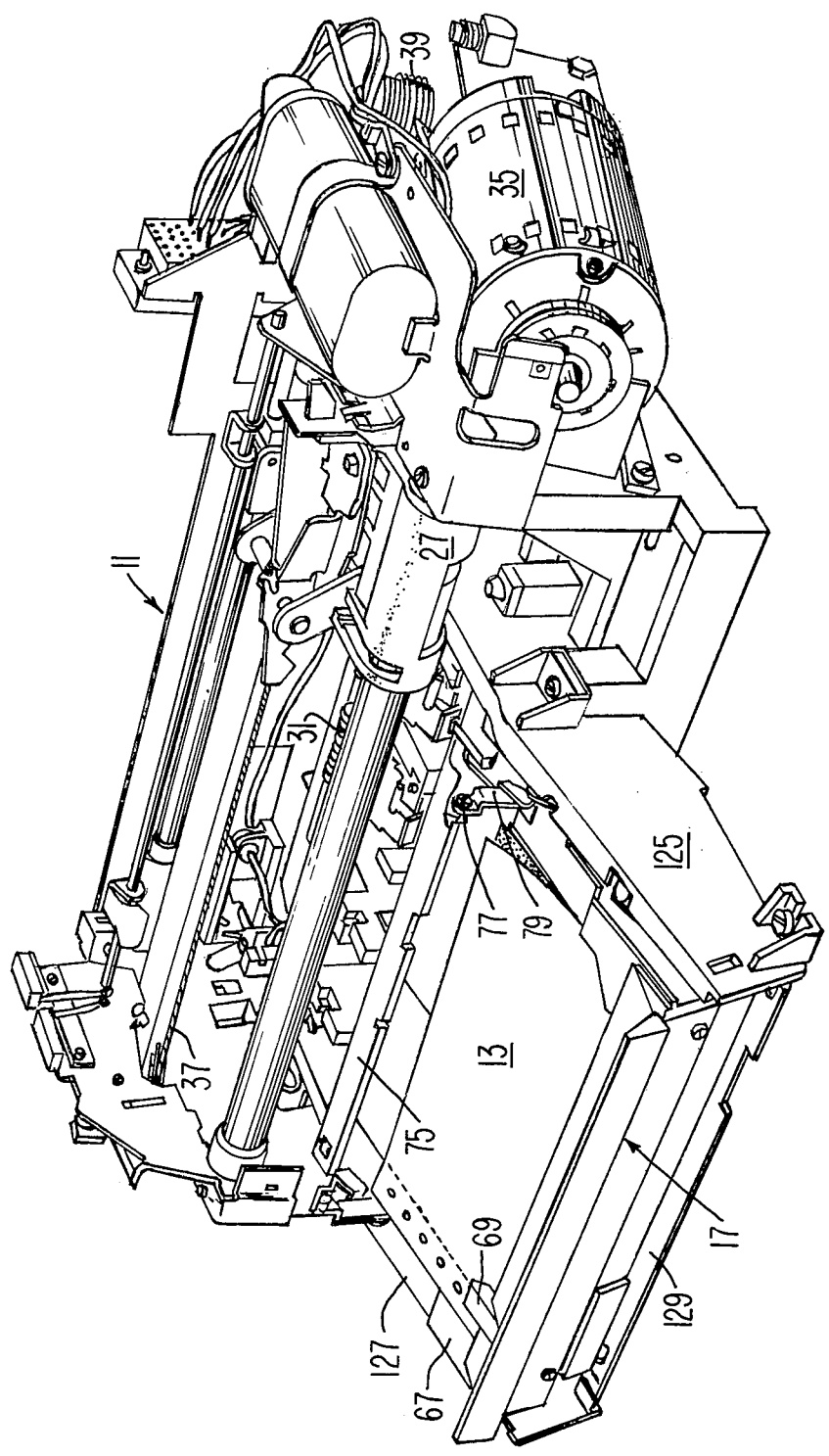
FIG. 4 is a perspective view of the terminal unit with the case removed therefrom to reveal various of its operating components.
Figure 5:
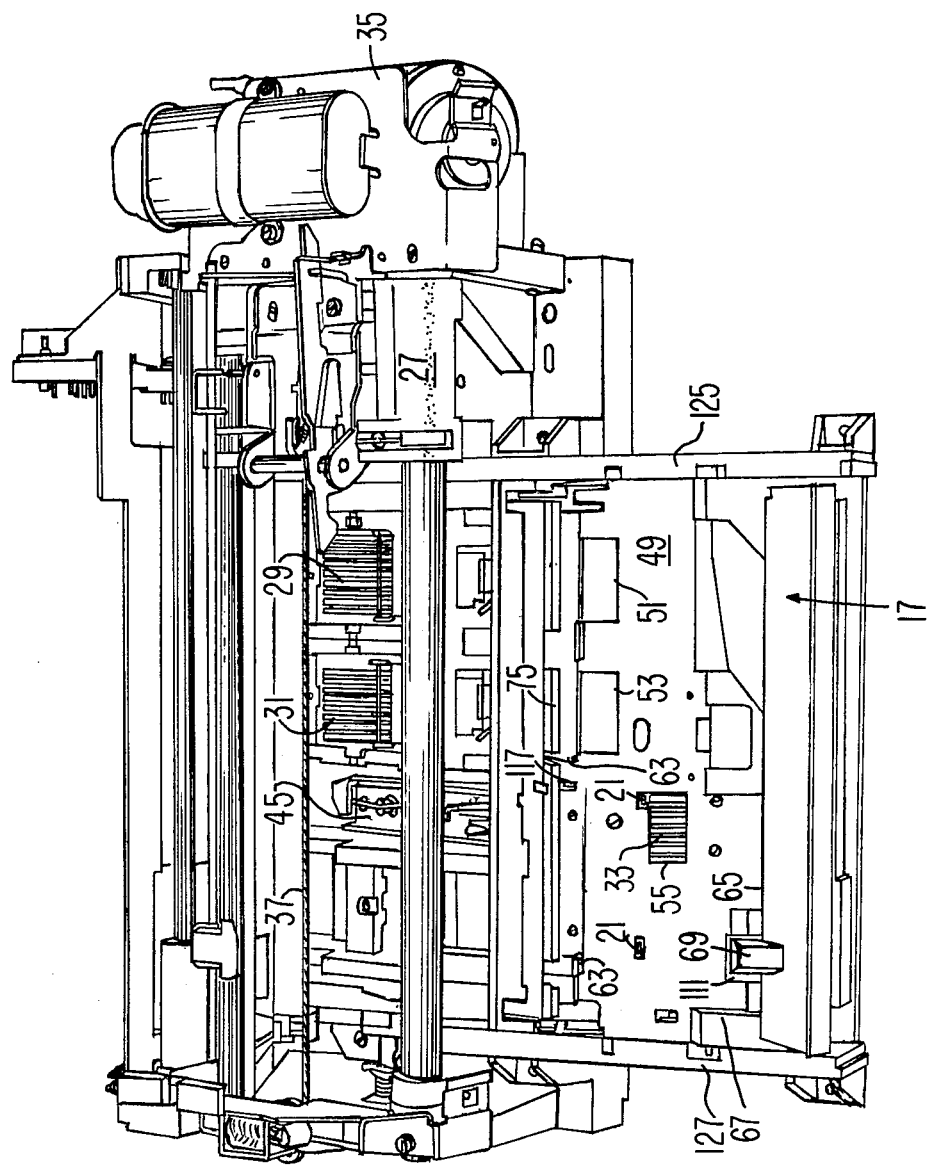
FIG. 5 is a plan view of the terminal unit with the case removed and the media tray located in its open media receiving position.
Figure 7:
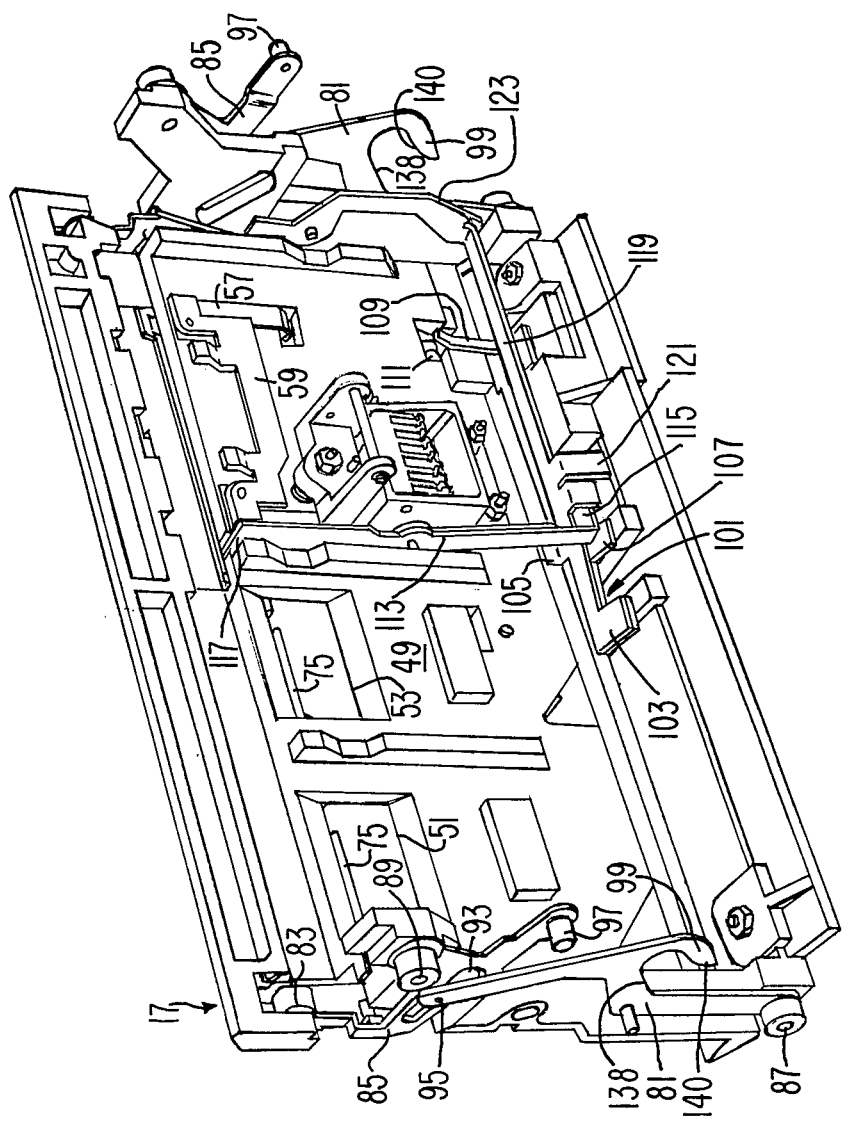
FIG. 7 is a perspective view of the underside of the media tray showing the inventive linkage means for controlling the translation of the tray and the pivotal and translatable activation of the document engaging member.

The inventive translatable media tray, as best illustrated in FIGS. 5 and 7, is comprised of a web member 49 having a plurality of rectangular apertures formed therein, a first aperture 51 serving to accommodate the transaction code print wheels 29, a second aperture 53 to accommodate the transaction data print wheels 31, and a third aperture 55 to accommodate the date print wheels 33 carried by the tray. The aforementioned resilient retention fingers 21 best shown in FIGS. 1 and 5 are formed by the upturned extremities of a pair of flexure members 57 secured to the underside of the web member 49 by a U-shaped retaining plate 59, as best illustrated in FIG. 7, the upturned retention fingers 21 passing through apertures in the web member to securably position a magnetic stripe credit card 15 against an abutment member 61 (FIGS. 1 and 5) formed in the web member 49. A pair of side edge abutting members 63 (FIG. 5) are also formed in the web member 49 to securably position a credit card against lateral movement. A latitudinally disposed abutment member 65 (FIGS. 1 and 5) is formed in the web member 49 for limitably positioning the bottom edge of a multi-sheet transaction document 13 within the media tray, and a longitudinally disposed abutment member 67 is formed in the web member 49 for limitably positioning the left edge of a multi-sheet document. A cantilevered projection member 69 is also provided as an integral part of the web member 49, for retainably positioning the bottom edge of a multi-sheet document within the media tray. In the event an embossed merchants identification plate is to be utilized in the terminal unit 11, at the position designated at 41 in FIG. 1, a pair of projecting dowel pins 71 would be formed in the web member 49 for engagably receiving such plate, and a pair of interconnected spring fingers 73 would be provided to retain the plate in engaged relationship with the dowel pins.

As best illustrated in FIGS. 8, 9, 12, 13 and 14, the inventive media tray is provided with a pivotally and translatably mounted elongated document engaging member or bail 75, such bail being pivotally activatable to engage the upper edges of the individual sheets of a multi-sheet document 13, and translatably activatable to remove the curl normally associated with such sheets, both activations occurring as the media tray 17 is translated from its open media receiving position to its closed media processing position. Each of the outermost extremities of the bail 75 is connected, at a first pivot point 77 thereof, to a short link member 79 of a broken jointed first link 81, and connected, at a second pivot point 83 thereof, to a second link 85. Each of the first links 81 is pivotally mounted on a shoulder portion of a roller carrying stud 87 fixed to the outermost extremity of the side surface of the tray, and each of the second links 85 is pivotally mounted on a shoulder portion of a roller carrying stud 89 fixed to the innermost extremity of the side surface of the tray. Each of the second links 85 is biased in a clockwise direction on its associated roller carrying stud 89 by a coil spring 91, one end of such spring being connected to an offset anchor member of the link 85 and the other end connected to an aperture in the web member 49. Each of the second links 85 is provided with a longitudinally disposed slot 93 in which is translatably carried a coupling member 95 pivotally connecting the short link member 79 to the broken jointed first link 81. Each of the second links 85 is provided, at the lowermost extremity thereof, with an actuating roller 97, and each of the broken jointed first links 81 is provided with an intermediately disposed curved depending projection 99, the function of the actuating rollers 97 and the projections 99 being hereinafter described.

Figure 10:
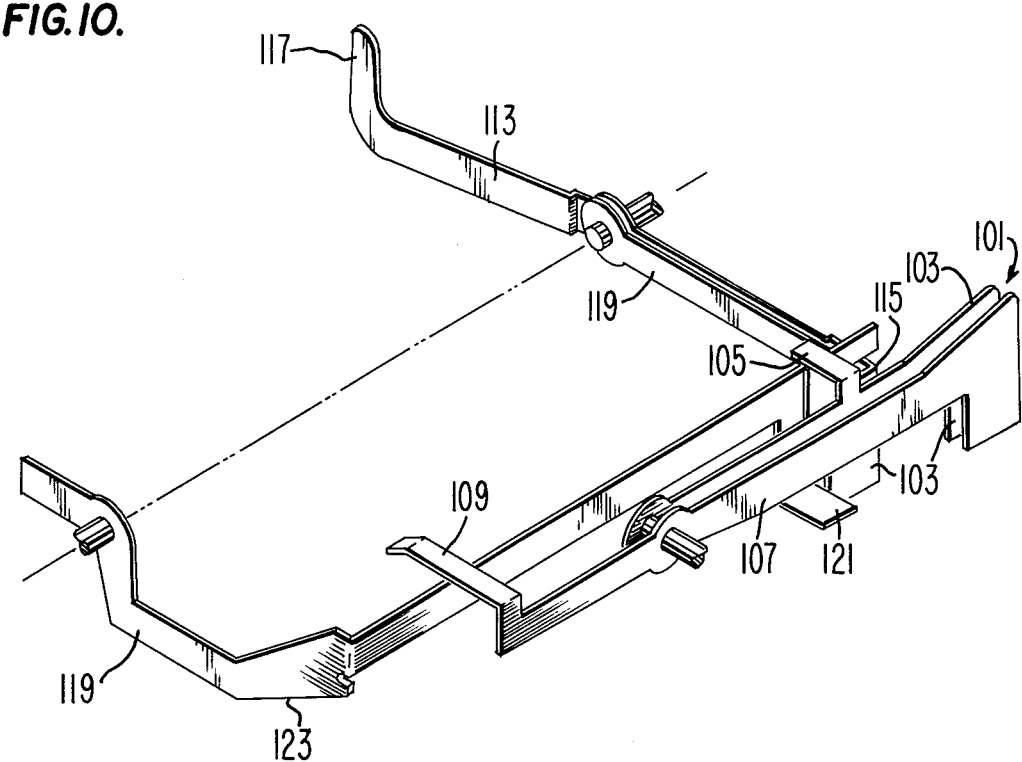
FIG. 10 is a perspective view of linkage means for blocking the translation of the tray to its closed media processing position when either a credit card or a transaction document is not properly positioned within the tray.

As best illustrated in FIGS. 7 and 10, the media tray 17 is also provided with a two-part limit member 101 pivotally mounted on the underside of the tray, a first part 103 thereof being provided with an offset lip 105 and a second part 107 thereof being provided with an offset feeler finger 109 that extends through an aperture 111 of the web member 49 and in aligned relationship with the cantilevered projection member 69 to thereby cooperate with the underside of a multi-sheet transaction document 13 positioned in abutting relationship with the abutment members 65 and 67. Also pivotally mounted on the underside of the web member 49 is a pivot arm 113 having an offset projection 115 cooperably disposed relative to the offset lip 105 of the first part 103 of the two-part limit member 101, and having also an upwardly extending projection 117 operably disposed within an aperture formed in the web member 49 to cooperate with the underside of a magnetic stripe credit card 15 limitably positioned within the media tray 17. Also pivotally mounted on the underside of the media tray 17 is a bail member 119 having an offset projection 121 disposed in cooperating relationship with the first and second parts 103 and 107 of the two-part limit member 101, and an inclined camming surface 123 the function of which is hereinafter described, along with the functions of camming surfaces presented by the curved depending projections 99 of the broken jointed first links 81.

Figure 6:
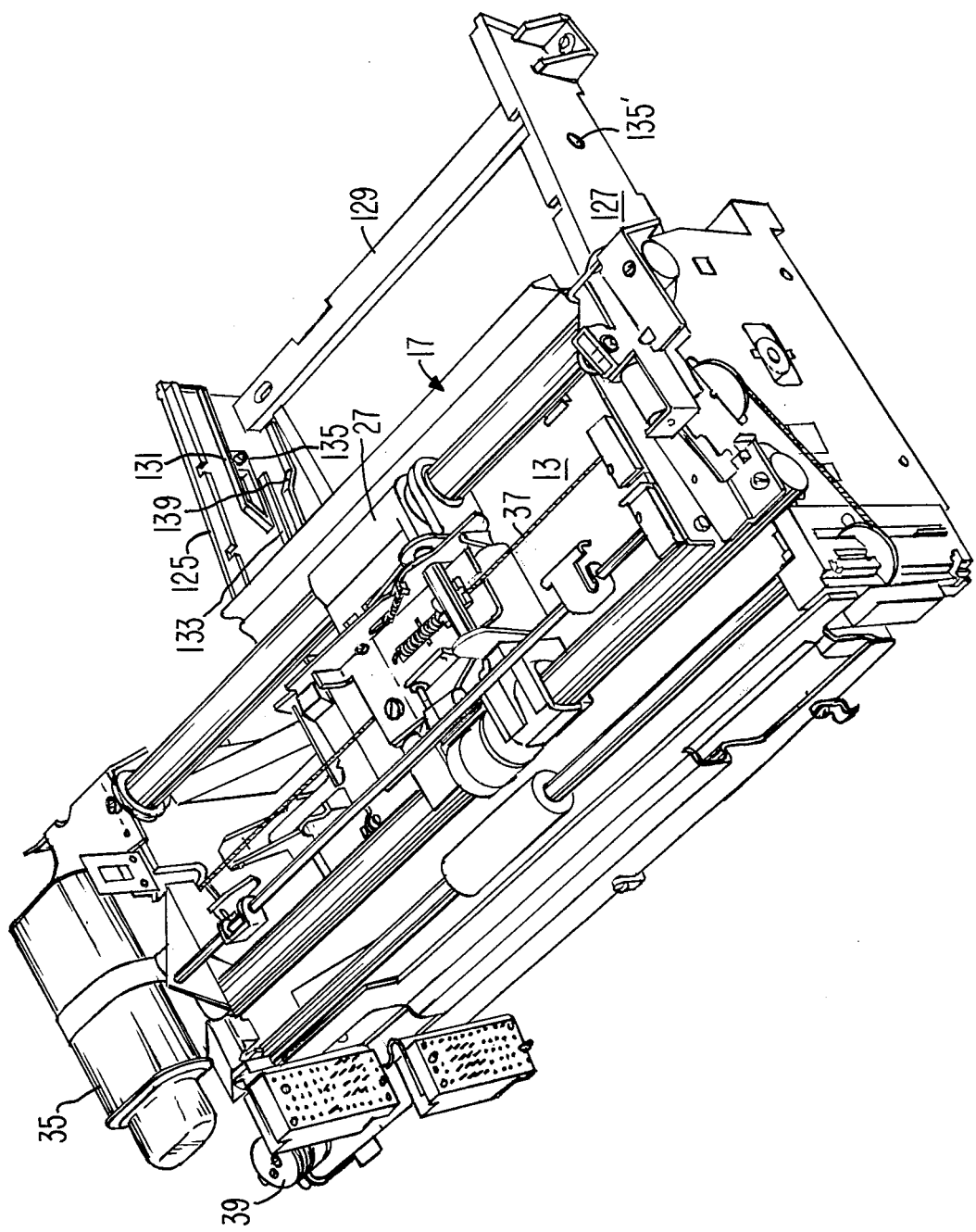
FIG. 6 is a perspective view of the terminal unit of FIG. 1 with the case removed and the media tray located in its closed media processing position, a print roller carrier thereof being shown in its half-way translated position.
Figure 14:
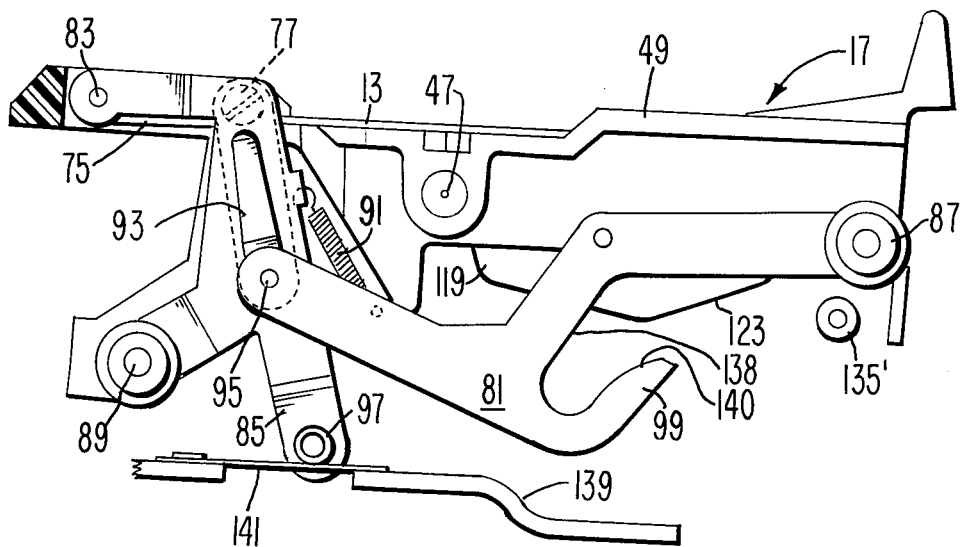
FIG. 14 is an elevational view similar to FIGS. 12 and 13 and showing the position of the bail and the relationship of the links and the selected supporting elements that would apply when the media tray is disposed in its closed or media processing position.
Figure 11:
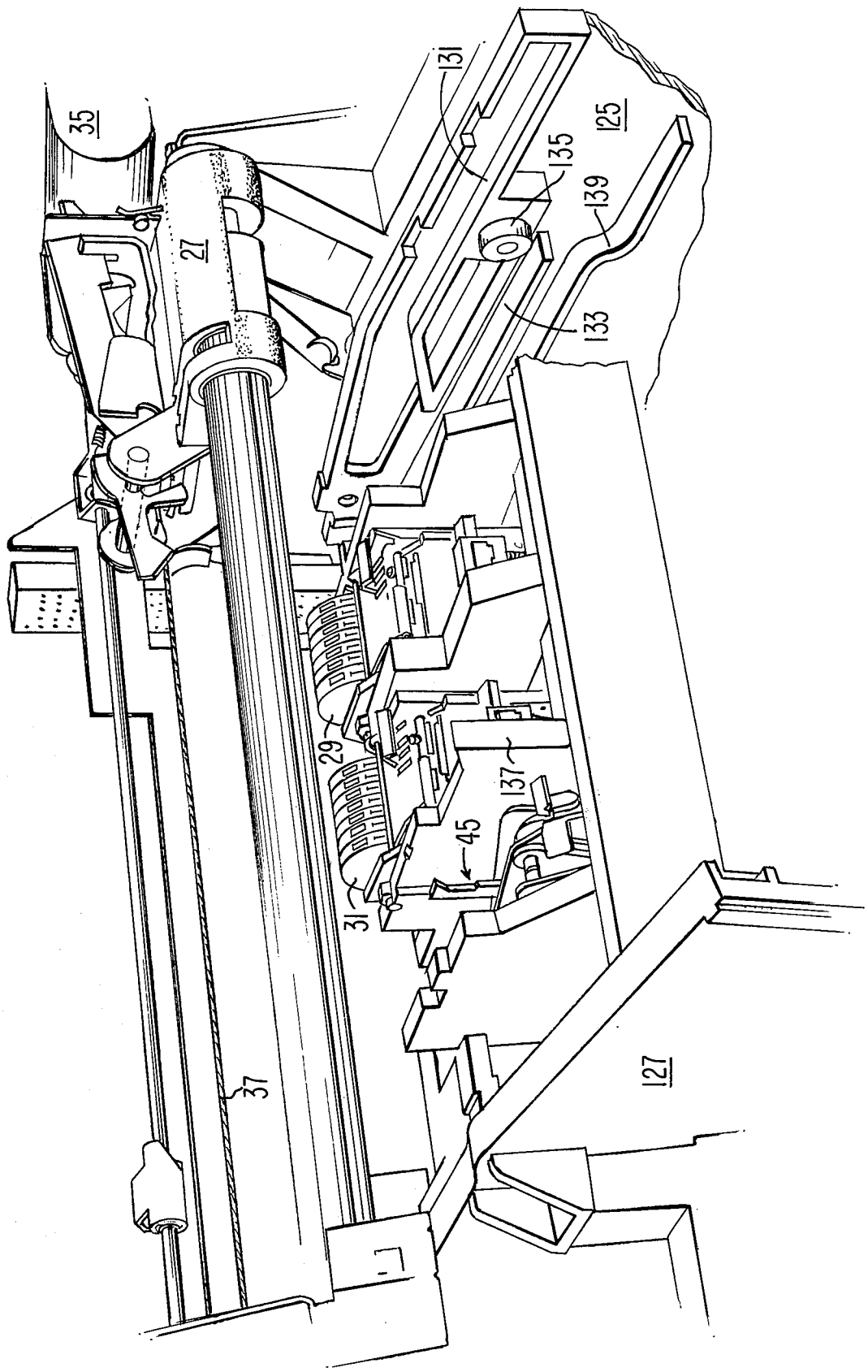
FIG. 11 is a perspective view of the supporting and guideway structure of the terminal unit with the media tray removed therefrom.

The inventive media tray 17 is translatably mounted within a pair of spaced apart channeled guide members 125 and 127, as best illustrated in FIGS. 6 and 11, such guide members being supported by and connected together by a support member 129. An upper rail 131 in each of the channeled guide members 125 and 127 serves to translatably guide a pair of rollers carried by the studs 87 on the shoulders of which the pair of first links 81 are pivotally mounted, and a lower rail 133 in each of the channeled guide members serves to translatably guide a pair of rollers carried by the studs 89 on the shoulders of which the pair of second links 85 are pivotally mounted. Disposed intermediate the upper rail 131 and lower rail 133 in the guide members 125 and 127 are a pair of rollers 135 and 135', respectively, the roller 135' being of greater linear dimension than the roller 135 for functional reasons hereinafter explained with reference to FIGS. 12, 13 and 14. With the media tray 17 installably positioned relative to the rails 131 and 133, the media tray may be translatably activated between its open media receiving position, as illustrated in FIGS. 1, 4, 5 and 12, and its closed media processing position, as illustrated in FIGS. 6 and 14.

With the media tray disposed in its open media receiving position, insertion of a magnetic stripe credit card 15 between the resilient retention fingers 21 and the associated abutment member 61 will result in the downward activation of the upwardly extending projection 117 of the pivot arm 113, to thereby rotate the pivot arm 113 in a clockwise direction (as viewed in FIG. 7), and to thereby elevate part 103 of the two-part limit member 101 to a non-blocking relationship with an abutment surface 137 (FIG. 11) of the supporting structure of the terminal unit. Insertion of a multi-sheet transaction document 13 into the media tray 17, with its leftmost edge in limiting contact with the abutment member 67 and its lowermost edge disposed underneath the cantilevered projection member 69 and in limiting contact with the longitudinally disposed abutment member 65, will result in the downward activation of the offset feeler finger 109, to thereby rotate part 107 of the two-part limit member 101 in a clockwise direction (as viewed in FIG. 7), and to thereby elevate part 107 to a non-blocking relationship with the abutment surface 137 (FIG. 11) of the supporting structure of the terminal unit. Accordingly, with a magnetic stripe credit card 15 and a multi-sheet transaction document 13 properly positioned relative to the web member 49 of the media tray 17, both parts of the two-part limit member 101 will have been elevated to a position where the media tray 17 may be translatably activated from its open media receiving position to its closed media processing position. In the event either a credit card 15 or a multi-sheet document 13 is not properly positioned within the media tray, however, a corresponding one of the parts 103 or 107 will not have been elevated to a non-blocking relationship with the abutment surface 137 of the supporting structure, and the media tray 17 will be blocked against translation from its open media receiving position to its closed media processing position.

Figure 8:
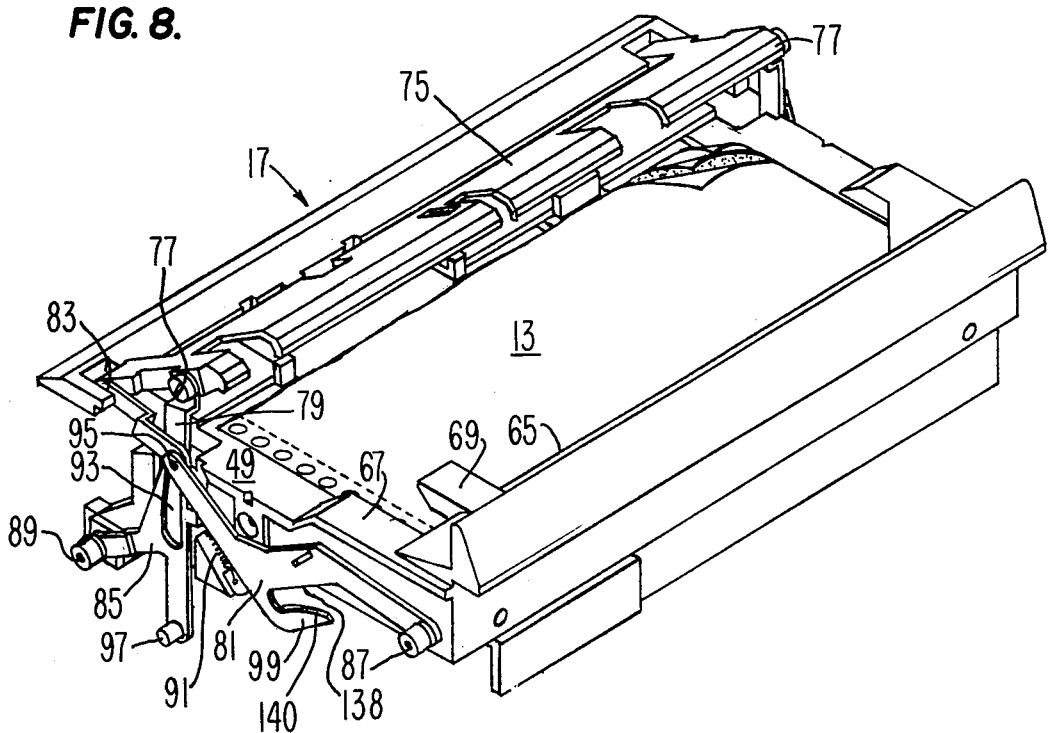
FIG. 8 is a perspective view of the media tray with a multi-sheet transaction document positioned therein, and with the elongated document engaging member or bail located in its elevated document receiving position, the individual sheets of the document revealing a normal curled condition.
Figure 9:
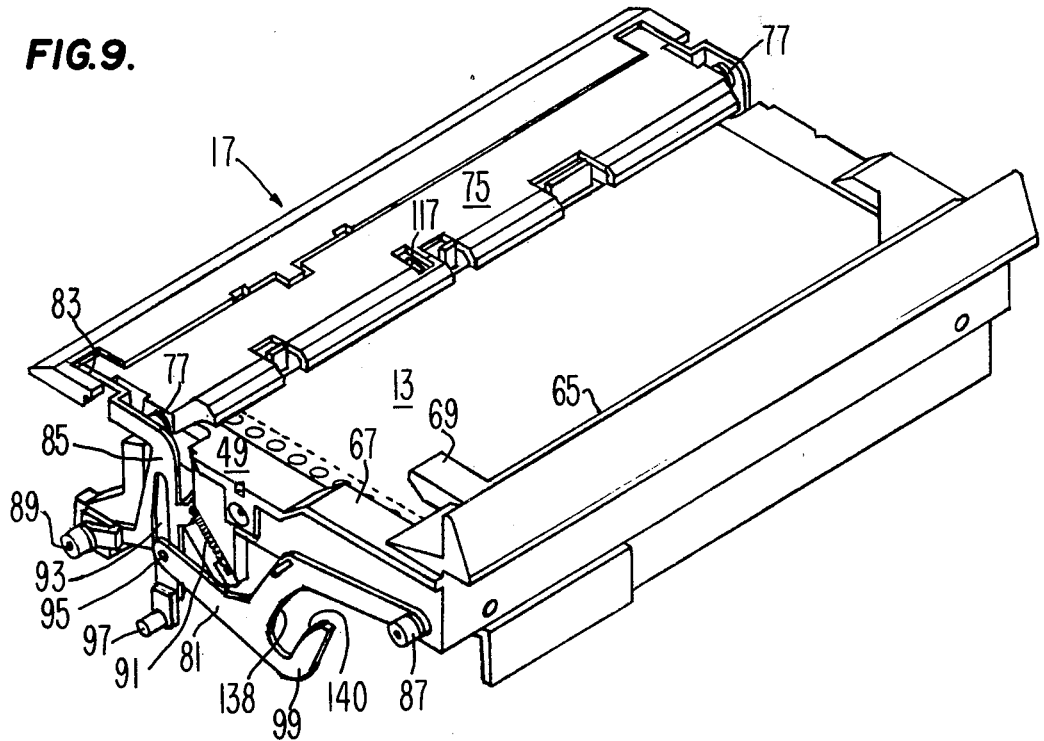
FIG. 9 is a perspective view similar to FIG. 8 but showing the bail in its document engaging position with the curl removed from the sheets of the document.
Figure 12:
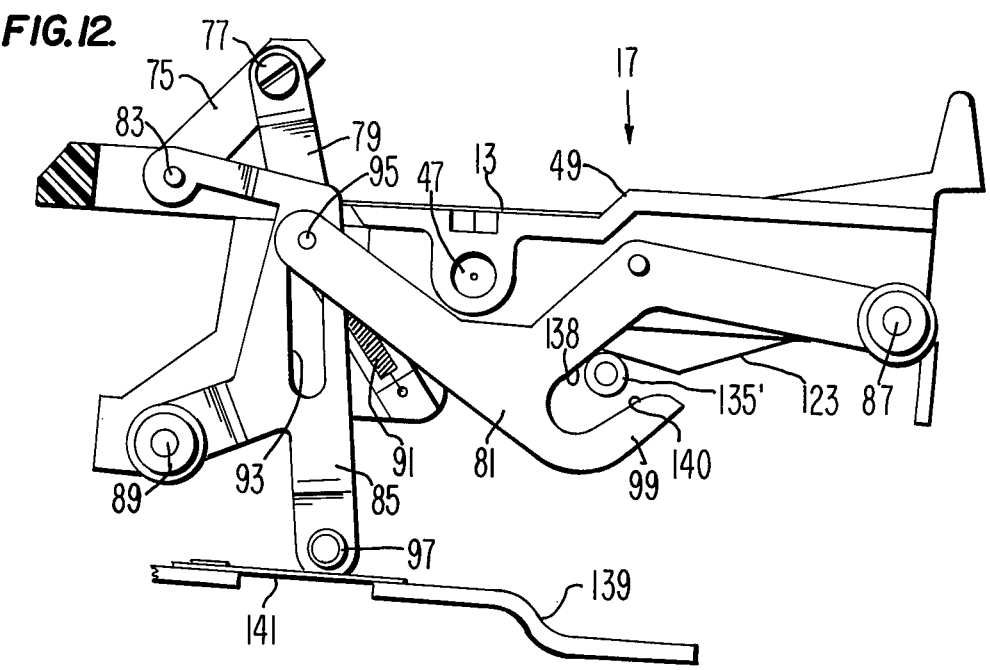
FIG. 12 is a left side elevational view of the media tray with the document engaging member disposed in its elevated document receiving and releasing position, and with various of the links thereof disposed in definitive relationship with selected elements of the supporting and guideway structure of the terminal unit, such definitive relationship of the links with said selected elements representing the open or media receiving position of the tray.

With the media tray 17 installed within the channeled guide members 125 and 127 and translated to its open media receiving position, the document engaging member or bail 75, under the control of the broken-jointed first links 81 and second links 85, is pivotally activated to a document receiving and releasing position and translatably activated a minimal distance in a rightward direction which may be defined as a curl engaging position, such positions being best illustrated in FIG. 12. This pivotal activation of the bail 75 is accomplished by the contacting relationship of the rollers 135 and 135' of the channeled guide members 125 and 127 with first camming surfaces 138 of the pair of broken-jointed first links 81, to thereby activate the first links 81 in a clockwise rocked position on the roller carrying studs 87, with the coupling members 95 thereof disposed in an upward translated position within the slots 93 of the second links 85, as best illustrated in FIGS. 8 and 12. The effect of the upward translation of the coupling members 95 is to raise the pivot points 77 of the bail 75 and to thereby pivotally activate the bail. The above described translatable activation of the bail 75 is accomplished by reason of a clearing relationship between the actuating rollers 97 of the second links 85 relative to a pair of ramps 139 (FIGS. 6 and 11) formed in the channeled guide members 125 and 127, such clearance permitting the pair of coil springs 91 (FIG. 12) to pivotally activate the second links 85 in a clockwise direction on the roller carrying studs 89. It is also to be noted from FIG. 12 that with the media tray 17 disposed in its open media receiving position, the roller 135' fixed to the channeled guide member 127 is also engaged with the camming surface 123 of the bail member 119 (FIG. 7), such contacting relationship serving to rotate the bail member 119 in a clockwise direction (as viewed in FIG. 7) to thereby rotate the pivot arm 113 and part 107 of the two-part limit member 101 in a clockwise direction, such rotation being effective to lower the projection 117 and the feeler finger 109 thereof to a position where they will not interfere with the insertable installation of a magnetic stripe credit card and a multi-sheet transaction document in the media tray 17.

Figure 13:
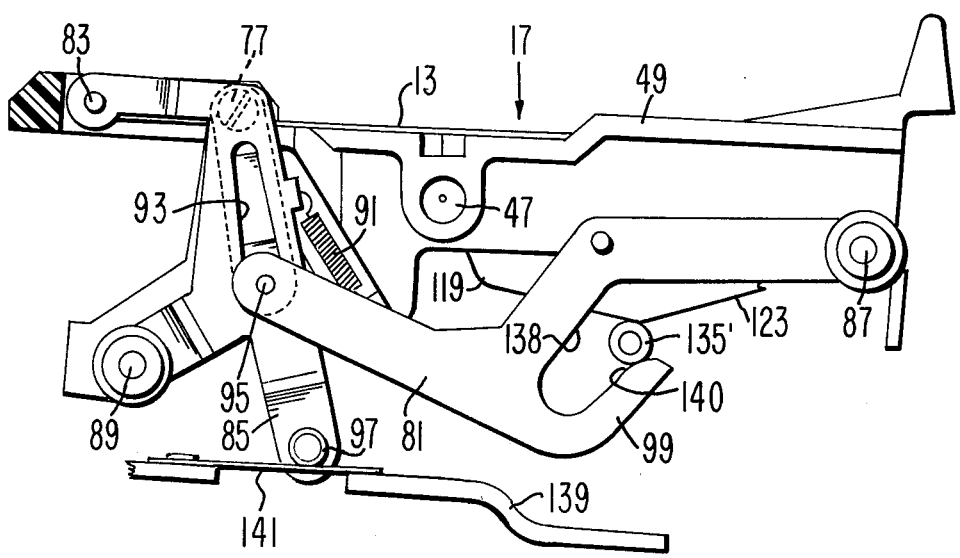
FIG. 13 is an elevational view similar to that of FIG. 12 and showing the position of the bail and the relationship of the links and the selected supporting elements that would apply when the media tray is located in a position intermediate its open and closed positions.

As the media tray 17 is translated from an open media receiving position toward a closed media processing position, the bail 75 is first pivotally activated into engagement with the curled sheets of the multi-sheet document, and then translatably activated a minimal distance in a leftward direction (as viewed in FIG. 13), such translatable activation serving to remove the curl from the individual sheets of the multi-sheet document 13. This pivotal and translatable activation of the bail 75 may best be explained with reference to FIG. 13, wherein the first camming surfaces 138 of the links 81 are shown to be displaced from the rollers 135 and 135' and the second camming surfaces 140 thereof are shown to be positioned in contacting relationship with said rollers. The roller 135' is also shown in FIG. 13 to be displaced from the camming surface 123 of the bail member 119, thereby enabling the blocking action of the two-part limit member 101 with the abutment surface 137 in the event either a credit card 15 or a transaction document 13 has not been properly positioned within the media tray. Contact of the second camming surfaces 140 of the first links 81 against the rollers 135 and 135' is effective to pivotally and forcibly activate the first links 81 in a counterclockwise direction on the studs 87 and, through the downward translation of the coupling members 95 in the slots 93, to pivotally activate the bail 75 in a downward direction into engaging relationship with the curled sheets of the multi-sheet document 13. Subsequent to the downward pivotal activation of the bail 75 during the translation of the media tray 17, the actuating rollers 97 of the second links 85 contact the ramps 139 of the channeled guide members 125 and 127, to thereby rotate the second links 85 in a counterclockwise direction on the studs 89, such rotation serving to translate the bail 75 in a leftward direction from its document engaging position to a curl removed position thereof.

With the media tray 17 located in its closed media processing position, as illustrated in FIG. 14, the first links 81 remain in a counterclockwise rocked position on the studs 87, after having been forced to such position by the action of the second camming surfaces 140 against the rollers 135 and 135', and the second links 85 are held in a counterclockwise rocked position on the studs 89 by the biasing effect of a pair of leaf springs 141 against the actuating rollers 97, the leaf springs 141 communicating with the ramps 139 of the channeled guide members 125 and 127.

Upon translating the media tray 17 from its closed media processing position to its open media receiving position, the above described activations of the first links 81 and second links 85 are reversed, to thereby pivotally activate the document engaging member or bail 75 from its document engaging position to its document receiving and releasing position, and to translatably activate the bail 75 from its leftmost curl removed position to its rightmost curl engaging position, such activations of the bail 75 being effective to release the processed multi-sheet document 13 and magnetic stripe credit card 15 preparatory to receiving a succeeding magnetic stripe credit card and multi-sheet transaction document.

While the preferred embodiment of the improved media tray has been described herein in considerable detail, it will be appreciated that various modifications and alterations therein may be conceived by persons skilled in the art without departing from the true spirit and scope of the invention.

What is claimed is:

1. A till-like document tray associated with supporting and guideway structure of a data processing terminal unit for translation as between a media receiving position and a media processing position therein, said document tray being effective for positionably receiving a multi-sheet document and a magnetic stripe credit card in a web member thereof, for removing the curl of the sheets of said multi-sheet document during the translation of said tray to said media processing position, and for securably holding the document relative to said web member during the printable transfer of output data thereto when said tray is in its said media processing position such that said data may be legibly recorded thereon, said document tray comprising:
   a. first means accessible when said tray is in its said media receiving position for limitably positioning said multi-sheet document relative to said web member such that said data may be printably and legibly transferred thereto, said first means including a pivotally and translatably activatable bail,
   b. second means accessible when said tray is in its said media receiving position for limitably positioning said magnetic stripe credit card relative to said web member,
   c. third means cooperating with said magnetic stripe credit card, with said multi-sheet document, and with said supporting and guideway structure to prevent the translation of said tray from its said media receiving position to its said media processing position whenever either a said multi-sheet document or a said magnetic stripe credit card is not limitably positioned relative to said web member within said tray, and
   d. fourth means coupled to said bail and effective for pivotally and translatably activating said bail as between an elevated document receiving and releasing position and a lowered document engaging and curl removing position, said fourth means cooperating with said supporting and guideway structure to lower said bail to its document engaging and curl removing position when said document tray is manually translated from its said media receiving position to its said media processing position, and to elevate said bail from its said document engaging and curl removing position to its said document receiving and releasing position when said document tray is automatically translated from its said media processing position to its said media receiving position upon the completion of media processing.

2. The document tray defined in claim 1 wherein said first means additionally comprises a first retention member associated with said web member and effective for securably positioning the lower edges of the sheets of said multi-sheet document upon the insertional installation of said document within said document tray.

3. The document tray defined in claim 2 wherein said pivotally and translatably activatable bail of said first means in cooperation with said first retention member thereof is effective for removing the curl associated with the sheets of said multi-sheet document during the translation of said document tray from its said media receiving position to its said media processing position.

4. The document tray defined in claim 2 wherein said second means comprises second retention members associated with said web member and effective for limitably positioning said magnetic stripe credit card such that a magnetic stripe latitudinally disposed on the reverse side thereof is aligned with a rectilinear aperture formed in said web member for the reading of data stored on said stripe by a translatable read head of said terminal unit.

5. The document tray defined in claim 1 wherein said third means comprises:
   a. a pivotally mounted limit member blockably associated with an abutment member of said supporting and guideway structure of said terminal unit, said limit member being pivotally activable as between an elevated position wherein clearance is provided over said abutment member and a lowered position wherein a blocking relationship is provided therebetween, and
   b. first linkage means cooperably associated with said limit member, with said supporting and guideway structure, and with the backsides of a said magnetic stripe credit card and a said multi-sheet document disposed in their limitably positioned relationships relative to said web member, such that said limit member is elevated to a clearing relationship with said abutment member to permit the manual translation of said document tray from its media receiving position to its said media processing position and to assure that said limit member is disposed in its elevated position when said document tray is located in its said media receiving position.

6. The document tray defined in claim 5 wherein the cooperable association of said first linkage means with the backsides of a said magnetic stripe credit card and a said multi-sheet document is accommodated by means of a pair of apertures formed in said web member of said document tray.

7. The document tray defined in claim 5 wherein the effect of said cooperable association of said first linkage means with said supporting and guideway structure when said document tray is located in its said media receiving position is to pivotally activate said first linkage means such that it will not interfere with the insertional installation of a said multi-sheet document and a said magnetic stripe credit card within said first and second retention members associated with said web member of said document tray.

8. The document tray defined in claim 5 wherein said fourth means comprises: second linkage means coupled to said pivotally and translatably activatable bail and cooperably associated with said supporting and guideway structure such that said bail is activated to its said elevated document receiving and releasing position when said document tray is automatically translated from its said media processing position to its said media receiving position, and activated to its said lowered document engaging and curl removing position when said document tray is manually translated from its said media receiving position to its said media processing position.

9. The document tray defined in claim 8 wherein said second linkage means comprises:
   a. a pair of spaced apart pivotally mounted first links coupled to corresponding and oppositely disposed first pivot points on the extremities of said pivotally and translatably activatable bail and disposed in cooperating relationship with said supporting and guideway structure, and
   b. a pair of spaced apart pivotally mounted second links coupled to corresponding and oppositely disposed second pivot points on the extremities of said pivotally and translatably activatable bail, said pair of first links in response to said supporting and guideway structure being effective upon the automatic translation of said document tray from its said media processing position to its said media receiving position to pivotally elevate said bail from its said document engaging position to its said document receiving and releasing position, and effective upon the manual translation of said document tray from its said media receiving position to its said media processing position to pivotally lower said bail from its said document receiving and releasing position to its said document engaging position.

10. The document tray defined in claim 9 wherein each of said pair of first links of said second linkage means is pivotally and translatably coupled to a corresponding one of said pair of second links thereof, said coupling being accommodated by means of a longitudinal slot formed in said second link and providing a substantially vertical path of travel for a broken joint of said first link, the outboard extremities of the pair of broken joints of the pair of first links being pivotally connected to said first pivot points on the extremities of said bail.

11. The document tray defined in claim 10 wherein said pair of pivotally mounted second links containing said longitudinal slots are pivotally connected at one end thereof to said second pivot points on the extremities of said bail, and wherein the opposite ends thereof cooperate with said supporting and guideway structure as said document tray is translated as between said media receiving position and said media processing position, to thereby translate said pivotally and traslatably activatable bail a predetermined minimal distance in corresponding directions, said translation of said bail a predetermined minimal distance in a first direction during said manual translation of said document tray from said media receiving position to said media processing position and after said bail has been pivotally activated from its said elevated document receiving and releasing position to its said document engaging position being effective to remove the curl associated with said sheets of said multi-sheet document, and to translate said bail from a first curl engaging position to a second curl removed position.

12. The document tray defined in claim 11 wherein the combined effect of the cooperation as between said supporting and guideway structure and said first and said second pair of links of said second linkage means during said translation of said document tray from said media processing position to said media receiving position is to translatably activate said bail a predetermined minimal distance in a second direction and away from its said second curl removed position, and to pivotally activate said bail from its lowered document engaging position to its elevated document receiving and releasing position, and wherein such combined effect during said translation of said document tray from said media receiving position to said media processing position is to pivotally activate said bail from its elevated document receiving and releasing position to its lowered document engaging position, and to translatably activate said bail said predetermined minimal distance in said first direction away from its said first curl engaging position to said second curl removed position, said pivotal activation of said bail being effectuated by means of said pair of pivotally mounted first links connected to said first pivot points thereof, and said translatable activation of said bail being effectuated by means of said pair of pivotally mounted second links connected to said second pivot points thereof.

13. In a point of sale data processing terminal unit wherein a document tray translatable as between a document receiving and a document processing position within supporting and guideway structure thereof is utilized to positionably hold a multi-sheet document during the printable recording of output data thereon, an actuatable bail device responsive to the translation of said document tray and effective for engaging the multi-sheet document and for removing the curl from the sheets thereof such that said output data may be legibly printed thereon, said actuatable bail device comprising:
   a. a pivotally and translatably mounted elongated document engaging member associated with said document tray and disposed in contactable relationship with the upper edges of the sheets of a said multi-sheet document when positionably received therein,
   b. a pair of defined first pivot points located on the opposite extremities of said elongated documented engaging member in contiguous relationship to said upper edges of the sheets of a positionably received multi-sheet document,
   c. a pair of defined second pivot points located on the opposite extremities of said elongated document engaging member adjacent said first pivot points and removed from said upper edges of a positionably received multi-sheet document,
   d. a pair of spaced apart pivotally mounted and broken-jointed first links cooperably associated with said supporting and guideway structure and coupled to said first pivot points, and
   e. a pair of spaced apart pivotally mounted second links cooperably associated with said supporting and guideway structure and coupled to said second pivot points and to said first links.

14. The actuatable bail device defined in claim 13 wherein said coupling of said pair of first links with said pair of second links is accommodated by means of a longitudinal slot formed in each of said pair of second links and providing a substantially vertical path of travel for the broken joint of a corresponding one of said pair of first links.

15. The actuatable bail device defined in claim 13 wherein the cooperation as between said supporting and guideway structure and said pair of first links is effective, when said document tray is translated from its said document processing position to its said document receiving position, to pivotally activate said elongated document engaging member from a lowered document engaging position to an elevated document receiving and releasing position, and effective, when said document tray is translated from its said document receiving position to its said document processing position, to pivotally activate said elongated document engaging member from its elevated document receiving and releasing position to its lowered document engaging position.

16. The actuatable bail device defined in claim 15 wherein the cooperation as between said supporting and guideway structure and said pair of second links is effective, when said document tray is translated from its said document receiving position to its said document processing position, to translatably activate said elongated document engaging member a predetermined minimal distance in a first direction to thereby remove the curl associated with the sheets of said multi-sheet document, and effective, when said document tray is translated from its said document processing position to its said document receiving position, to translatably activate said elongated document engaging member a predetermined minimal distance in a second direction to a point where it is preconditioned to perform a succeeding curl removing operation.

17. The actuatable bail device defined in claim 16 wherein the combined effect of the cooperation as between said supporting and guideway structure and said first and said second links, when said document tray is translated from its said document processing position to its said document receiving position, is to translatably activate said document engaging member a predetermined minimal distance in said second direction, and to pivotally activate said document engaging member from its said lowered document engaging position to its said elevated document receiving and releasing position, and, when said document tray is translated from its said document receiving position to its said document processing position, to pivotally activate said document engaging member from its said elevated document receiving and releasing position to its said lowered document engaging position, and to translatably activate said document engaging member a predetermined minimal distance in said first direction to thereby remove the curl associated with the sheets of the multi-sheet document.

18. In a point of sale data processing terminal unit effective for receiving a magnetic stripe credit card and a multi-sheet transaction document for input reading therefrom and output printing thereon, respectively, the improvement comprising:
 a. a translatable document tray effective for positionably receiving said magnetic stripe credit card and said multi-sheet transaction document,
 b. supporting and guideway structure within which said document tray is translatable as between a media receiving position and a media processing position,
 c. first means associated with said supporting and guideway structure and effective for preventing the manual translation of said document tray from said media receiving position to said media processing position whenever either a multi-sheet document or a magnetic stripe credit card is not positioned within said document tray, and
 d. second means responsive to said supporting and guideway structure and effective for securably engaging the sheets of said multi-sheet document and for removing the curl therefrom during the manual translation of said document tray from said media receiving position to said media processing position, such that said multi-sheet document is securably positioned without curl within said document tray at the time of said output printing on said document.

19. The improvement defined in claim 18 wherein said first means comprises:
 a. a limit member pivotally mounted on said document tray and blockably associated with said supporting and guideway structure, said limit member being pivotally activatable as between an elevated non-blocking position and a lowered blocking position, and
 b. first linkage means cooperably associated with said limit member, with said supporting and guideway structure, and with said multi-sheet document and said magnetic stripe credit card positionably located within said document tray, said first linkage means being effective to elevate said limit member to its said non-blocking relationship relative to said supporting and guideway structure when both a multi-sheet document and a magnetic stripe credit card are positionably located within said document tray, and to lower said limit member to its said blocking relationship therewith when either a multi-sheet document or a magnetic stripe credit card is not present in or positionably located in said tray.

20. The improvement defined in claim 19 wherein said second means comprises:
 a. an elongated document engaging member associated with said document tray and disposed in contactable relationship with the sheets of a said multi-sheet document, said elongated document engaging member being pivotally activatable as between an elevated document receiving and releasing position and a lowered document engaging position, and translatably activatable a predetermined minimal distance as between a first curl engaging position and a second curl removed position, and
 b. second linkage means coupled to said elongated document engaging member and cooperably associated with said supporting and guideway structure such that said elongated document engaging member is pivotally activated to its said elevated document receiving and releasing position and translatably activated to its said first curl engaging position when said document tray is translated from its said media processing position to its said media receiving position, and pivotally activated to its said lowered document engaging position and translatably activated to its said second curl removed position when said document tray is translated from its said media receiving position to its said media processing position.

21. The improvement defined in claim 20 wherein said second linkage means comprises:
 a. a pair of spaced apart pivotally mounted and broken-jointed first links cooperably associated with said supporting and guideway structure and coupled to corresponding and oppositely disposed first pivot points on the extremities of said elongated document engaging member, and b. a pair of spaced apart pivotally mounted second links cooperably associated with said supporting and guideway structure and coupled to said first links and to corresponding and oppositely disposed second pivot points on the extremities of said elongated document engaging member.

22. The improvement defined in claim 21 wherein said coupling of said pair of first links with said pair of second links is accommodated by means of a longitudinal slot formed in each of said pair of second links and providing a substantially vertical path of travel for the broken joint of a corresponding one of said pair of first links.

23. The improvement defined in claim 21 wherein the cooperation as between said supporting and guideway structure and said pair of first links is effective, when said document tray is translated from its said media processing position to its said media receiving position, to pivotally activate said elongated document engaging member from its said lowered document engaging position to its said elevated document receiving and releasing position, and effective, when said document tray is translated from its said media receiving position to its said media processing position, to pivotally activate said elongated document engaging member from its said elevated document receiving and releasing position to its said lowered document engaging position.

24. The improvement defined in claim 21 wherein the cooperation as between said supporting and guideway structure and said pair of second links is effective, when said document tray is translated from its said media receiving position to its said media processing position, to translatably activate said elongated document engaging member from its said first curl engaging position to its said second curl removed position, and effective, when said document tray is translated from its said media processing position to its said media receiving position, to translatably activate said elongated document engaging member from its said second curl removed position to its first curl engaging position.

25. The improvement defined in claim 21 wherein the combined effect of the cooperation as between said supporting and guideway structure and said first and said second links, when said document tray is translated from its said media processing position to its said media receiving position, is to translatably activate said elongated document engaging member from its said second curl removed position to its said first curl engaging position, and to pivotally activate said elongated document engaging member from its said lowered document engaging position to its said elevated document receiving and releasing position, and, when said document tray is translated from its said media receiving position to its said media processing position, to pivotally activate said elongated document engaging member from its said elevated document receiving and releasing position to its said lowered document engaging position, and to translatably activate said elongated document engaging member from its said first curl engaging position to its said second curl removed position.

* * * * *